June 26, 1951      E. O. KRUEGER      2,558,687
AIR SPEED CONTROL VALVE
Filed June 22, 1948
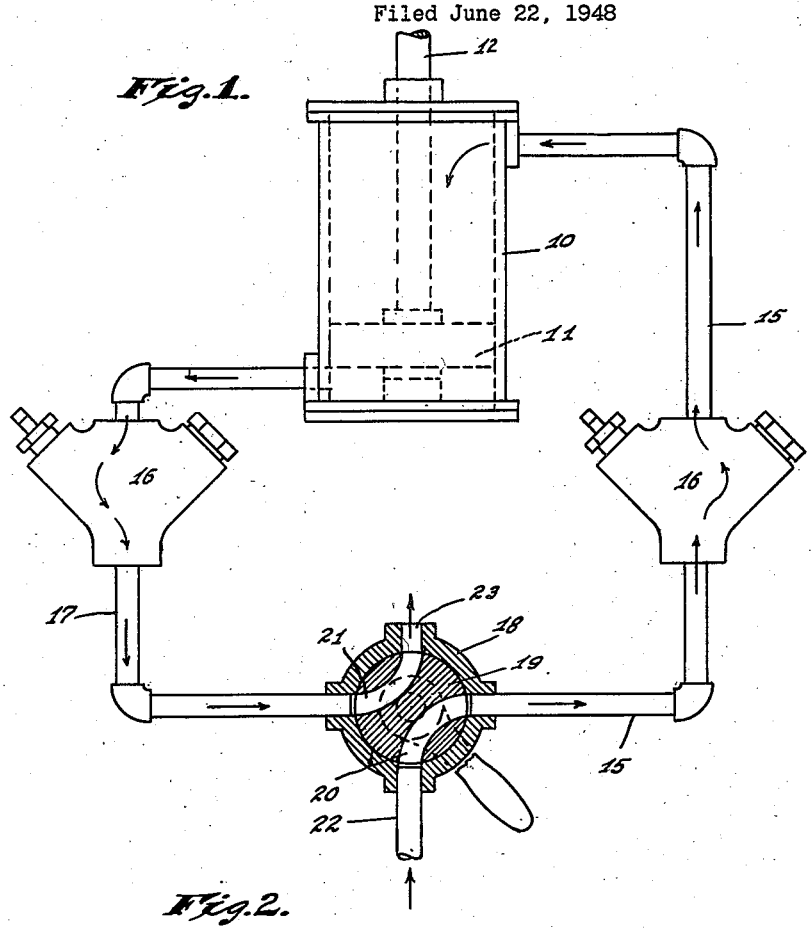
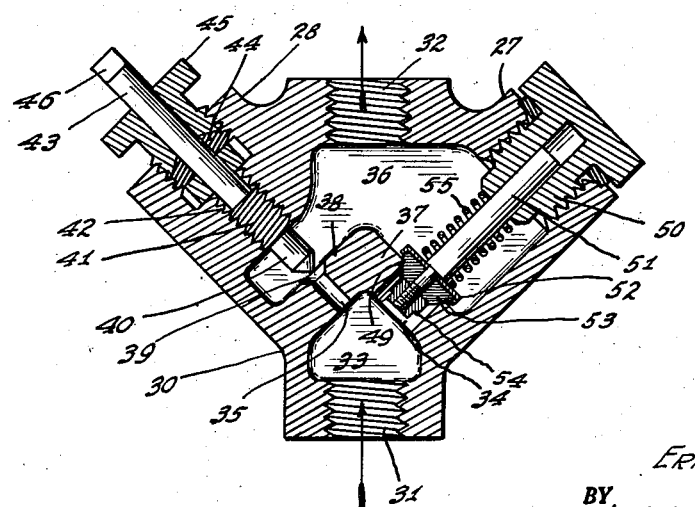
INVENTOR.
ERNEST OTTO KRUEGER,
BY
*Schley, Hark & Jenkins*
ATTORNEYS.

Patented June 26, 1951

2,558,687

UNITED STATES PATENT OFFICE 2,558,687

AIR SPEED CONTROL VALVE

Ernest Otto Krueger, Logansport, Ind.

Application June 22, 1948, Serial No. 34,449

2 Claims. (Cl. 277—54)

This invention relates to a control valve for air operated mechanism.

In one method of controlling the air to air operated mechanism such as a piston in a cylinder, the supply of air to the cylinder, or both to and from the cylinder, is controlled by a manually or automatically operable cut-off valve, and speed regulation or timing is obtained by placing in one or more of the air lines a speed-control valve which throttles the flow of air in one direction through that line and which permits air to flow in the opposite direction through the line without substantial restriction.

It is the object of my invention to provide an improved speed-control valve for such service, which will be of simple construction and operation and of long life, which will provide parallel air circuits leading directly through the valve, one of which circuits will contain a throttle and will provide free and direct air flow to and from the throttle and give a ready and accurate throttling adjustment over a wide range, and the other of which circuits will contain an improved poppet valve of light-weight construction and reliable operation and will give substantially improved freedom of unthrottled flow.

In accordance with my invention, I provide a valve casing, desirably with opposite co-axial end-openings for connection to the air line, and form the casing to provide two valve-supporting bosses, desirably symmetrical on opposite sides of the axis of the openings and at an acute angle with respect thereto; I divide the interior of the casing with a dividing wall which has angular portions alined with, and normal to the axes of, the bosses; and in one such wall portion I provide a port through which air flow is regulated by an adjustable throttle valve, and in the other such wall portion I provide a by-pass port through which air flow is controlled by an improved one-way poppet valve.

The accompanying drawing illustrates my invention:

Fig. 1 is a schematic diagram indicating the relationship of my valve in the air system for air operated mechanism; and Fig. 2 is a longitudinal section through a valve embodying my invention.

In Fig. 1 the air operated mechanism shown is a cylinder 10 containing a piston 11 connected to a piston rod 12 which may be connected to operate any desired reciprocating part. The upper end of the cylinder 10 is connected to an air line 15 containing one of my valves 16 positioned to permit unthrottled air flow to the cylinder. The bottom end of the cylinder 10 is connected to an air line 17 also containing a valve 16 embodying my invention and also positioned to permit unthrottled air flow to the cylinder. The two air lines 15 and 17 are connected to a manual four-way valve 18, the valve member 19 of which contains two passages 20 and 21. Air is supplied to the valve through an air line 22, and the valve casing is provided with an exhaust port 23.

With the valve in the position shown, air enters through the air line 22, traverses the valve passage 20 and flows under pressure through the air line 15. It freely passes through the valve 16 in the line 15 and forces the piston 11 downward to the position shown. During this movement of the piston 11, the lower end of the cylinder 10 is exhausted through the line 17, the valve 16 contained in line 17, and through the manual valve passage 21 and exhaust port 23. Passage of the exhaust air through the valve 16 in line 17 is throttled, to regulate that flow of air, and hence to impose a speed control upon the movement of the piston 11. For reverse operation of the piston 11, the manual valve 18 is turned to a position at right angles to that shown, so that the bottom of the cylinder 10 is connected to the air supply through line 17, and the top of the cylinder 10 is connected through the air line 15 to the exhaust 23. Under such circumstances, air flow through the system is in the opposite direction from that described above, the valve 16 in the line 17 passes the air without throttling, and the valve 16 in the line 15 throttles the exhaust air from the upper end of the cylinder 10, to impose a speed control on that exhaust air and on the upward motion of the piston 11.

The air system of Fig. 1 is by way of example only, for the general system is known, and many variations may be used. For example, whereas the system of Fig. 1 shows two valves 16 to impose speed control in both directions of piston movement, only one such valve 16 may be used, as where speed control is desired in only one direction.

As shown in Fig. 2, my valve comprises a generally triangular or Y-shaped casing 30 with an air opening 31 at the bottom and a central air opening 32 at the top. The casing 30 is cored to provide a lower chamber 33 inside the air opening 31, and a second air upper chamber 36 inside the air opening 32 and separated from the chamber 33 by a dividing wall or partition which has inclined portions 37 and 38 disposed at opposite angles to the common axis of the two air openings, and respectively normal to and opposite to two bosses 27 and 28 formed on the casing 30. A large air passage or by-pass port 34 leads upward and to the right through the dividing-wall portion 37 coaxial with the boss 27; and a smaller air passage or port 35 leads upwardly to the left through the dividing-wall portion 38 co-axial with the boss 28. Both air passages 34 and 35 connect the lower and upper air chambers 33 and 36; and the casing thus provides two parallel and direct air circuits between the two end openings 31 and 32—one by way of the port 34 and the other by way of the port 35. It should be noted that the opening 31 is provided in an integral cylindrical extension and that this extension and portions of the partition form the lower chamber 33 which chamber is somewhat smaller than the upper chamber. It will also be evident that the upper chamber is provided with branches which lead to the passages 34 and 35 and that these passages are so arranged that their axes intersect at a point in the lower chamber.

The port 35 is formed at its upper end to provide a seat 39 for a needle valve 40 the shank of which carries screw threads 41 received in a threaded hole 42 in the boss 28, in axial alignment with the air passage 35. The stem 43 of the needle valve 40 is sealed in the boss 28 by a gland 44 compressed by a gland nut 45, and the outer exposed end of the stem 43 is formed to provide a head 46 by which the needle valve may be adjusted.

The port 34 is formed at its upper end to form a poppet valve seat 49, desirably with the face of the seat 49 at an angle of 45° with the axis of the port 34.

In co-axial alignment with the air passage 34 and valve seat 49, the boss 27 of the casting 30 is bored to pass the poppet valve (described below) and to receive a fitting 50 which closes the bore and which forms a guide sleeve for the stem 51 of the poppet valve. The stem 51 of the poppet valve is slidably received in the fitting 50 and its lower end is of reduced diameter and threaded, and such reduced end carries a cup 52 which receives and supports a replaceable valve washer 53 held in place by a nut 54. A light coil spring 55 surrounds the stem 51 of the poppet valve between the cup 52 and the fitting 50 and urges the valve into sealing engagement with the valve seat 49.

The valve washer 53 is made of a material, softer than that of the valve seat 49, and is preferably made of a tough resilient rubber-like material, desirably one resistant to oil, such as synthetic rubber.

Operation is as follows: Under the conditions of the valve 16 in the air line 15 of Fig. 1, with the air flowing in the direction indicated in Fig. 1, air under pressure enters the lower air opening 31 of the valve casting 30, to the air chamber 33. The pressure of the air lifts the poppet valve 51—53 from its seat 49, and the air flows substantially without restriction to the air chamber 36 and thence out the air opening 32, as to the upper end of the cylinder 10. A small portion of the air also flows through the air passage 35 and past the needle valve 40, but this is incidental since the air is flowing freely in the same direction through the air passage 34.

Air flow in the opposite direction through the valve is indicated by the conditions of the valve 16 in the exhaust line 17 from the lower end of the cylinder. In this case, air enters the upper air opening 32 of the casting 30, to the air chamber 36. The air pressure maintains the poppet valve 51—53 in closed position, and the larger air passage 34 is tightly sealed. A small flow of air, determined by the adjustment of the needle valve 40, flows downward past the needle valve 40 and through the small air passage 35 to the lower air chamber 33 and thence out the bottom air opening 31, to the exhaust. The exhaust flow of air is thus throttled by the needle valve 40, and back pressure is exerted on the piston 11 to impose a firm speed control on the movement of that piston 11.

Reversal of the air flow through the system by turning the valve 19 to a position at right angles to that shown, reverses the conditions of the two valves 16 in the lines 15 and 17 respectively. The line 17 becomes the feed line, and the poppet valve 51—53 of its valve 16 opens freely to permit unrestricted flow of air to the bottom of the cylinder 10 to raise the piston 11; while line 15 becomes the exhaust line, and in its valve 16 the poppet valve 51—53 is closed and air flows only through the port 35 and is regulated by the throttling action of the needle valve 40.

The needle valves of the two valves 16 may be adjusted independently, to impose either the same or a different amount of throttling and back pressure on the two opposite strokes of the piston 11. For example, the needle valve 40 associated with the line 17 may be opened fairly wide, to impose little throttling and permit a rapid downstroke of the piston 11, while the needle valve 40 associated with the line 15 may be opened but slightly, to impose a greater throttling action and to secure a slow upstroke of the piston 11.

My improved speed control valve provides air openings which are in co-axial alignment, or substantially so, and between which there are two air circuits that are parallel both functionally and physically. Both air circuits lead substantially directly from one air opening to the other, with a minimum of turns, and with no abrupt turns, in the passages forming the two circuits. The unthrottled-flow circuit is of equal or greater cross-sectional area throughout its length than the air lines leading to and from the valve, so that unthrottled air flow occurs substantially without restriction. Throttled flow may be regulated over a wide range, and adjustment is smooth and responsive, without interference or throttling effects of tortuous or restricted passages in other parts of the throttling circuit.

The poppet valve is guided directly to its seat 49 and its washer 53 seals readily and reliably, and the moving parts are of light weight and require but relatively light spring pressure. Substantially no wear is imposed on the valve seat, and the valve washer may be replaced readily and conveniently. The combination gives improved operation and long life.

I claim as my invention:

1. A valve comprising a generally triangular one-piece hollow body having a pair of upper corners, a bottom corner, a top wall between the upper corners, a partition forming an upper chamber and a lower chamber in the body, a pair of passages provided in said partition, one of the upper corners being provided with a threaded aperture arranged in alignment with one of the passages, a nut in said aperture, a valve guided by the nut and having a portion for closing and opening said one passage, the other upper corner of the body being provided with a threaded aperture, a threaded member in said aperture, a valve element interposed between the threaded member and the other passage for opening and closing said other passage, the top wall of the body being provided with an opening communicating with the upper chamber and providing means for connecting the valve to a pipe, the bottom corner of the body being provided with a hole located opposite said opening, and said hole communicating with the lower chamber and providing means for connecting the valve to another pipe.

2. A valve comprising a generally triangular one-piece hollow body having a pair of upper corners, an outer boss formed on each of the upper corners, a bottom corner, a top wall provided with a boss arranged substantially midway between the aforesaid bosses, a partition forming an upper chamber in the body, said partition consisting of a pair of portions respectively arranged substantially parallel to the faces of said outer bosses, a passage provided in each of the partition portions, one of the outer bosses being provided with a threaded aperture coaxially aligned with one of the passages, a tubular packing nut in said aperture, a valve guided by the nut and having a portion for closing and opening said one passage, the other outer boss on the body being provided with a threaded aperture, a threaded member in said aperture, a valve element interposed between the threaded member and the other passage for opening and closing said other passage, the boss in the top wall of the body being provided with an opening communicating with the upper chamber and providing means for connecting the valve to a pipe, and an integral tubular extension provided in the bottom corner of the body providing means for connecting the valve to another pipe and forming with said partition a lower chamber communicatively connected to the upper chamber through said passages.

ERNEST OTTO KRUEGER.

REFERENCES CITED

The following references are of record in the file of this patent:

UNITED STATES PATENTS

| Number | Name | Date |
|---|---|---|
| 992,822 | Stoddard | May 23, 1911 |
| 1,018,126 | Nageborn | Feb. 20, 1912 |
| 1,509,508 | Grunwald | Sept. 23, 1924 |
| 1,668,669 | Caldwell | May 8, 1928 |
| 1,692,795 | Clifford | Nov. 20, 1928 |
| 1,797,118 | Beach | Mar. 17, 1931 |
| 1,984,328 | Bechtold | Dec. 11, 1934 |